Nov. 7, 1967 C. E. OWEN 3,351,837

ANALOG SAMPLE AND HOLD CIRCUIT

Filed Oct. 3, 1966

INVENTOR
CHARLES EDWARD OWEN
BY [signature]
ATTORNEY 3,351,837

ANALOG SAMPLE AND HOLD CIRCUIT

Charles Edward Owen, Chandlers Ford, England, assignor to International Business Machines Corporation, Armonk, N.Y., a corporation of New York Filed Oct. 3, 1966, Ser. No. 583,917
Claims priority, application Great Britain, Oct. 6, 1965, 42,492/65
5 Claims. (Cl. 320—1)

ABSTRACT OF THE DISCLOSURE

An analog sample and hold circuit utilizing a cyclically generated incremental voltage for both comparing the charge stored on the analog sample and hold circuit and for regenerating that charge.

This invention relates to sampling and holding analog signals.

In data processing systems, which operate on analog signals, it is frequently desirable to sample an analog signal and hold (or store) a representation of the sample signal. The held signal is then subsequently available for immediate utilization within the data processing system.

Analog sample and hold circuits of the prior art have employed capacitors to hold the desired signal level. The capacitors were charged to a potential determined by an input analog signal and then the capacitors were isolated.

The analog sample and hold circuits and techniques of the prior art, although satisfactory for certain applications, possessed some real disadvantages. For example, the inherent leakage path possessed by the storage capacitors limited the useful signal holding time to a relatively short time period. The charge on the capacitor decayed as it slipped away through the leakage path. In order to compensate for this, it was necessary either to utilize significantly higher quality (and more expensive) capacitors or adopt compensatory circuit packaging techniques, such as encapsulating the entire circuit. To package circuits in this manner made repair difficult, if not impossible; took up more space than desirable; and was expensive. Neither of these approaches (i.e. better capacitors or encapsulation) was satisfactory.

Accordingly, it is a general object of this invention to improve the art of sampling and holding analog signals.

A particular object of this invention is to provide analog sample and hold circuitry wherein the held signal can be maintained relatively constant over long periods of time.

Another particular object of this invention is to provide analog sample and hold circuitry utilizing capacitive charge regeneration so as to maintain a held signal value constant over a relatively long period of time.

Still another object of this invention is to provide analog sample and hold circuitry which utilizes the charge leakage phenomenon to control the operation of associated regenerative circuitry, thereby maintaining a held value constant over a relatively long period of time.

Briefly stated, then, my invention comprises analog sample and hold circuitry utilizing a storage capacitor for receiving and holding a sample of an input analog signal. Further, my invention comprises generator means for cyclically generating an incremental voltage. Comparator means for comparing the charge stored on the capacitor with each step of the incremental voltage are also a part of my invention. Lastly, my invention includes means for cyclically recharging the capacitor by connecting the generator means to the charge storage capacitor when the incremental voltage either equals or first exceeds the capacitor voltage.

One of the primary advantages offered by the circuitry of my invention is the ability to sample an input analog signal, store a quantitative representation of that signal and maintain the stored quantitative representation constant over a relatively long period of time. This is accomplished by utilizing relatively simple and economical circuitry; it is not necessary to go to the sophisticated and expensive components and packaging techniques known to the prior art. The knowledge that the quantitative representation of the input analog signal will be available for a long period of time enables the associated data processing apparatus to be utilized more efficiently. Further, the invention utilizes a heretofore undesirable feature of capacitive storage techniques (namely, the charge decay) to initiate the necessary regeneration of the stored charge to restore it to its prior level.

The foregoing and other objects, features and advantages of the invention will be apparent from the following more particular description of a preferred embodiment of the invention, as illustrated in the accompanying drawings.

The structure of FIGURE 1 will be discussed initially from the viewpoint of a block diagram/schematic drawing. Exemplary components for the blocks will then be presented.

Figure 1:
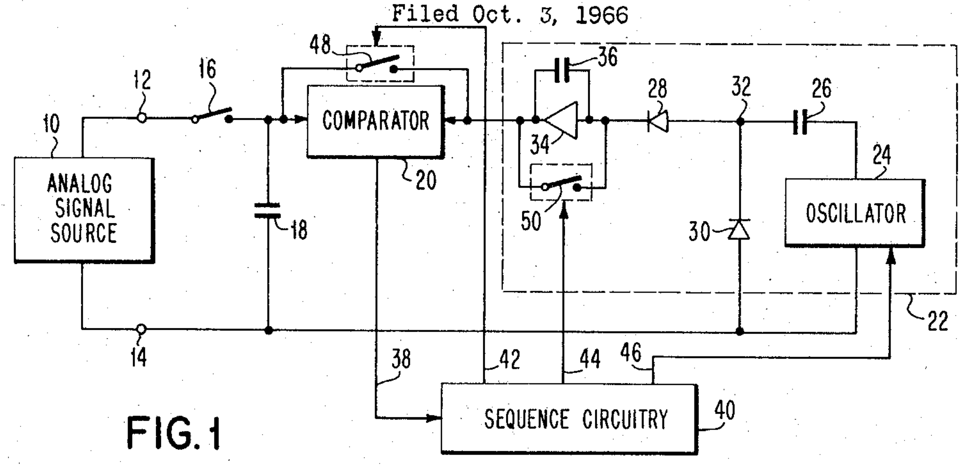
FIGURE 1 shows, partially in block diagram form and partially in schematic form, a preferred embodiment of analog sample and hold circuitry operating according to the principles of this invention.

With reference then to the structure of the preferred embodiment shown in FIGURE 1, input analog signals from signal source 10 are applied across input terminals 12, 14. Switch 16, when closed, samples the input analog signals appearing across terminals 12, 14, thereby charging storage capacitor 18 with an electrical potential corresponding to that of the input analog signal. Storage capacitor 18 possesses a quantitative representation of the input analog signal. Capacitor 18 is, in turn, connected as an input to comparator circuit 20.

As a second input, comparator circuit 20 receives a staircase voltage from signal generation circuitry 22, shown in dotted lines. Signal generation circuitry 22 comprises, in the preferred embodiment of my invention, a rising staircase voltage generator. More particularly, the staircase voltage generator used in the preferred embodiment of my invention includes an oscillator 24, a capacitor 26, a plurality of diodes 28, 30 connected at junction 32, and an integrating circuit comprising amplifier 34 and capacitor 36. Capacitor 36 is connected in parallel across amplifier 34.

As noted, the staircase voltage generated by signal generation circuitry 22 is applied as a second input to comparator 20. When the staircase voltage is equal to, or first greater than, the charge stored on capacitor 18, comparator 20 emits an output signal. That signal is applied along line 38 to sequence circuitry 40. Sequence circuitry 40 then emits signals on lines 42, 44, 46 respectively so as to operate switches 48, 50 in turn and to halt oscillator 24.

The operation of the circuitry shown in FIGURE 1 will be described more fully in connection with FIGURE 2. However, some exemplary types of equipment suitable for utilization in the circuitry of FIGURE 1 will be mentioned first. Comparator circuit 20 may, for example, comprise a differential amplifier having its output coupled to a monostable circuit. The monostable circuit then produces an output pulse as the output of the differential amplifier reaches a predetermined value;

and that value indicates that the staircase voltage from signal generation circuitry 22 either equals or first exceeds the voltage stored on capacitor 18. Sequence circuitry 40 may be, for example, a shift register arranged to shift an input signal through each of its stages or it could comprise a delay line having tappings for providing signals to line 42, 44, 46 respectively (as would the noted shift register). Switches 48, 50 may be either armature or reed relays for lower circuit operating speeds; semiconductive devices could be employed if higher operating speeds are desired. Switch 16 may form part of a multiplex system in which data from a plurality of sources is selectively applied to a number of sample and hold circuits. The structural examples recited above are merely exemplary. Other suitable components may be substituted by those skilled in the art to which this invention pertains.

Figure 2:
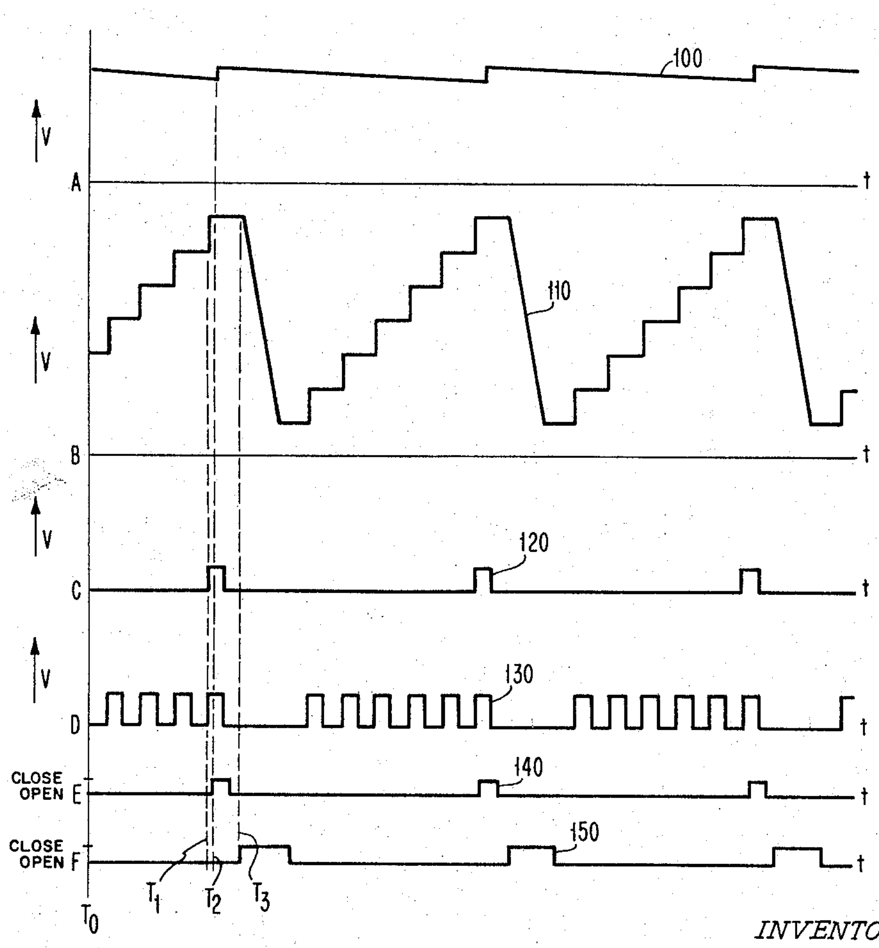
FIGURE 2 is a composite wave form and timing diagram illustrating the operation of the circuitry shown in FIGURE 1.

The operation of the circuitry shown in FIGURE 1 may best be understood by referring to FIGURE 2, a timing diagram showing the wave forms present in the preferred embodiment of FIGURE 1. Curve 100 in FIGURE 2 plots the voltage present on storage capacitor 18 against time. One can thus see the slightly decaying nature of this charge as curve 100 slopes to the right. It is this decaying property for which my invention compensates. Curve 110 plots against time the voltage signal applied from amplifier 34 (or, more generally, generation circuitry 22) to comparator 20. Curve 120 similarly plots against time the signal provided by comparator 20 on line 38. Curve 130 plots against time the voltage signals generated by oscillator 24 and applied to capacitor 26. Curve 140 shows the timed operation of normally-open switch 48; switch 48 is closed within the square waves shown on curve 140. Similarly, curve 150 shows the timed operation of normally-open switch 50.

With continued reference to FIGURE 2, and in conjunction with FIGURE 1, an input analog signal from source 10 is applied across input terminals 12, 14 at time $T_0$. The input analog signal is sampled by switch 16 and stored upon capacitor 18; the voltage on capacitor 18 falls slowly due to the inherent leakage path of capacitor 18. At the same time (i.e., beginning with time $T_0$), the staircase voltage 110 steadily steps up in response to output pulses from oscillator 24 until, at time $T_1$, it reaches a potential slightly above the voltage on capacitor 18. Note that curves 100 and 110 are drawn to different voltage scales. At this time (namely, time $T_1$) as can be seen from curve 120, comparator 20 emits an output signal on line 38. This signal is applied to sequence circuitry 40, which provides a control signal on line 46 to stop oscillator 24 and a control signal on line 42 to close switch 48 (see curve 140 in FIGURE 2) at time $T_2$. Capacitor 18 is thereby recharged through the now-closed switch 48 by the staircase voltage plotted as curve 110. Switch 50 (see curve 150 of FIGURE 2) is closed at time $T_3$ by a signal present on line 44 from sequence circuitry 40, thereby resetting generation circuitry 22 (and oscillator 24 is restarted). A second staircase voltage is then generated by generation circuitry 22 and the above cycle of operation is repeated.

Capacitor 18 is, therefore, cyclically recharged by generation circuitry 22 so as to maintain its stored potential constant within limits determined by the incremental amplitude of the output voltage from generation circuitry 22. A limitation on the operating speed of the circuit is that capacitor 18 must be so selected that the voltage stored on capacitor 18 does not fall in an amount greater than the amplitude of a single increment (or step) of wave form 110. Suitable means can be provided for reading out the stored voltage on capacitor 18 when desired. Lastly, it should be noted that the staircase signal developed by generation circuitry 22 should evidence identical wave forms during each cycle of operation.

While the invention has been particularly shown and described with reference to a preferred embodiment thereof, it will be understood by those skilled in the art that the foregoing and other changes in form and detail may be made therein without departing from the spirit and scope of the invention.

I claim:

1. Circuitry for sampling and holding an electrical potential corresponding to an analog input signal value comprising in combination:

electrical potential storage means for receiving and storing said electrical potential;

signal generating means for generating an incremental voltage signal comprising a cyclically recurring rising staircase voltage having a series of voltage levels;

comparing means for comparing said electrical potential on said electrical potential storage means to said voltage signal at each increment of said voltage signal; and means responsive to said comparing means for cyclically recharging said electrical potential storage means to one of said voltage levels with said incremental voltage signal when said incremental voltage signal equals or first exceeds said electrical potential.

2. A circuit of the type set forth in claim 1 for sampling and holding an electrical potential corresponding to an analog input signal value wherein:

said incremental voltage signal comprises a cyclically recurring rising staircase voltage;

said comparing means includes a comparator circuit for generating an output signal when said electrical potential equals or first exceeds an incremental value of said rising staircase voltage; and said means for cyclically recharging said electrical potential storage means comprises switching means for connecting said rising staircase voltage to said electrical storage means in response to the output of said comparator circuit.

3. Circuitry of the type set forth in claim 2 for sampling and holding an electrical potential corresponding to an analog input signal value, comprising in addition:

reset means responsive to the output of said comparator circuit for resetting said signal generating means after said signal generating means has been switched into connection with said electrical potential storage means.

4. Circuitry of the type set forth in claim 3 for sampling and holding an electrical potential corresponding to an analog input signal value wherein said signal generator means comprises an oscillator, a charge storage means, and an integrating amplifier, said charge storage means being connected in electrical series between said oscillator and said integrating amplifier.

5. Circuitry of the type set forth in claim 4 for sampling and holding an electrical potential corresponding to an analog input signal value wherein:

said means for cyclically recharging said electrical potential storage means further includes sequence circuitry responsive to the output of said comparator circuit for controlling the transfer of said staircase voltage to said electrical potential storage means, the operation of said oscillator circuitry, and the resetting of said signal generating means.

References Cited

UNITED STATES PATENTS

| | | | |
|---|---|---|---|
| 3,105,170 | 9/1963 | Palmer | 320—1 X |
| 3,273,013 | 9/1966 | Shepard | 320—1 X |

TERRELL W. FEARS, *Primary Examiner.*